United States Patent [19]

Grunwald

[11] Patent Number: 4,652,101

[45] Date of Patent: Mar. 24, 1987

[54] OVERHEAD PROJECTOR

[76] Inventor: Peter H. Grunwald, Rheinstrasse 37-39, 6070 Langen, Fed. Rep. of Germany

[21] Appl. No.: 723,252

[22] Filed: Apr. 15, 1985

[30] Foreign Application Priority Data

Apr. 13, 1984 [DE] Fed. Rep. of Germany ....... 3413995
Feb. 27, 1985 [DE] Fed. Rep. of Germany ....... 3506968

[51] Int. Cl.$^4$ .............................................. G03B 21/00
[52] U.S. Cl. ............................... 353/122; 353/DIG. 5; 353/DIG. 3; 353/DIG. 4; 353/23; 353/65
[58] Field of Search ................. 353/65, 61, 38, 22–24, 353/95, 44, DIG. 2, DIG. 3, DIG. 4, DIG. 5, 122, 121; 350/331 R, 333

[56] References Cited

U.S. PATENT DOCUMENTS 3,576,364  4/1971  Zanoni ............................ 353/122 X
3,844,650 10/1974  Nicholson ................. 353/DIG. 5 X
3,922,667 11/1975  Veda ................................ 350/333 X

FOREIGN PATENT DOCUMENTS

1401066  7/1975  United Kingdom ................ 350/333

Primary Examiner—Harry N. Haroian
Attorney, Agent, or Firm—Robert E. Burns; Emmanuel J. Lobato; Bruce L. Adams

[57] ABSTRACT

In an overhead projector comprising a writing plate, and under this arranged Fresnel lens, a light source and an objective carried by a carrying arm, the problem to be solved is to overcome the disadvantages of the state of the art and to provide a possibility for a lecturer to make information retrieved from an electronic information source, for example, a computer or an electronic game, accessible to a large viewer and listener circle. The invention solves this problem thereby, that between the Fresnel lens and the writing plate there are arranged a layer of liquid crystals which are aligned in an electric field and transparent electrodes on both sides thereof, whereby two of the plates or films traversed by the light beam have light polarizing properties.

18 Claims, 10 Drawing Figures

OVERHEAD PROJECTOR

The invention relates to an overhead projector comprising a writing plate under which there is arranged a Fresnel lens, a light source and an objective carried by a carrying arm.

For about 25 years, overhead projectors have been a favorite accessory in schools, universities and other places in which lectures are held in order to give a lecturer the possibility during the projection of a transparency to draw on this transparency or add characters which are already projected during the drawing or writing. These advantanges have brought about that flourescent screens have in general found no entry into lecture rooms while small slide projectors,in spite of their advantages of low price and acceptionally good software, have found use much less than overhead projectors, often only as secondary apparatus with an overhead projector.

In general, where there is a computer, there is a flourescent screen. In banks, insurance offices, retail establishments as well as government agencies and similar operations, the output text of a computer is rendered visible on a flourescent screen when it is not printed through an automatic printer. This visualization on a flourescent screen is in general sufficient because the information recalled from the computer is in general read by only one person. When several persons should read the text, more flourescent screen are provided, frequently one for each person. By reason of this, the computer is not prevalent for teaching in schools, universities and the like as it controls the life in banks, insurance offices, retail establishments and government agencies. There where work with a computer in teaching is indispensible, a large number of flourescent screens are required or it is necessary to make a printed text accessible to the students or audience through an overhead projector.

Besides the flourescent screen, another means for visualizing the output text of a computer has come strongly into the forefront: it is the liquid crystal display apparatus know as LCD's (Liquid Crystal Display).

These LCD's are found as display devices in pocket calculators and also as display devices in the electronic pocket games. Also, they are only suitable to make the displayed material or text visible to one or at most two persons. Their advantage is that they are inexpensive in production and are exceptionally suitable for visualizing computer output information. Their disadvantage, of being read by only one or at most two persons at the same time has however permitted them to find no entry into the instruction technique in schools, universities and other places of instruction.

It is an object of the present invention to overcome the disadvantages of the state of the art and to provide the possibility of a lecturer making available information from an electronic information source, such for example as a computer or an electronic game, to a large number of viewers and listeners.

For this purpose, the invention uses a known overhead projector comprising a writing plate, a Fresnel lens thereunder, a light source and an objective carried by a carrying arm. For this purpose, both known types of overhead projectors, namely, the type with light box arranged under the Fresnel lens but also especially the other type with a mirror under the Fresnel lens, can be used.

The invention consist therein that between the Fresnel lens and the writing plate, there are arranged a layer of light deflecting liquid crystals oriented in an electrical field and transparent electrodes on both sides thereof, whereby one of the plates transparent to light rays has light polarizing properties.

The invention solves the basic problem in that an LCD is brought in the light rays of the overhead projector or a member of the overhead projector outlined in the light rays is used as a member of an LCD which is then penetrated by the rays of the overhead projector and the information to be displayed is projected on a projection screen. It is thereby possible to make information from a computer and other electronic information apparatus as also electronic games, accessible to a large public. That opens a wholly new perspective for lectures for instruction but also for the playing of games. In instruction, information taken from a computer can now be made visible on a projection screen while at the same time, the instructor can draw or write in the picture appearing on the projection screen. While in the display of a text on a flourescent screen, expensive auxiliary apparatus is required in order to overlay a picture on the text shown on the flourescent screen that the lecturer must plot on a special picture plate on which the text derived from the computer is not the present, the lecturer here can as simply as is possible with any overhead projector and as almost every lecturer is accustomed to do, paint write and draw in any color on the writing plate of the overhead projector, under which the computer picture to be projected appears.

Wholly new possibilities likewise accure for the playing of electronic games because the games are no longer limited to one or two persons participating, but an arbitrary number of persons can observe as well take direct part. Thereby can a game leader, for example, add lines, letters or numbers to the picture projected on the projection screen.

Both types of overhead projectors, as well those with light boxes as well as with a reflector arranged under the Fresnel lens, are suitable for this purpose. The picture is sharper with an overhead projector with a light box, while the picture has better contrast with an overhead projector with a reflector under the Fresnel lens.

One embodiment is so constructed that the Fresnel lens and the writing plate are carriers for the transparent electrodes between which the liquid crystals are enclosed and held together by a common frame in which the electrodes lead to terminals in or on the frame. An embodiment of this kind is selected for a new overhead projector which is constantly to be used with the LCD.

Another embodiment is characterized in that between the writing plate and the Fresnel lens, there is arranged at least one further transparent plate with transparent electrodes for enclosing the layer of liquid crystals between it and the writing plate or the Fresnel lens, or a further plate and with which the electrodes are connected with terminals in or on a frame holding at least the two electrode-carrying plates. This emobdiment is selected where it will not constantly be used with the LCD but also with older apparatus. Advantageously, the frame is formed as a support for the previous writing plate of the overhead projector whereby advantageously the plate lying on the liquid crystal layer is used as the writing plate.

In particular with overhead projectors operating by the reflex method, this support frame can be used in association with a special Fresnel lens of which the upper face can also carry the electrode arrangement in order to reduce the writing plate—Fresnel lens spacing as well as also the liquid crystal—Fresnel lens spacing.

A further embodiment consist in that the layer of liquid crystals is enclosed between two plates that are arranged between the Fresnel lens and the writing plate and which carry the transparent electrodes which lead to terminal contacts arranged in a frame that holds at least the two electrode-carrying plates. In this embodiment, the LCD is arranged between the Fresnel lens and the writing plate. An LCD of this kind can later be added to a previous writing projector and according to the need, can be added or removed when the writing projector is arranged with the writing plate hinged in its frame.

It is advantageous when the frame is hollow and accommodates in its interior electronic components for the supply of voltage to the transparent electrodes. These electrodes must be supplied with voltage in a particular manner whereby the electronic components serve to accommodate themselves in the hollow frame in a space-saving manner.

However, it can be advantageous when the frame, on at least one side outside the writing projector housing or the face plate of the Fresnel lens and a mirror, has a housing to receive terminal contacts and/or electronic switching, control, transmission and/or storage elements and/or a ventilator and/or a power supply. This housing or housing part mounted on one or more sides of the frame provides good accommodation for the entire electronics for controling the liquid crystal. Moreover, a ventilator for cooling the LCD can be mounted here.

It is advantageous when a cold light mirror is used as the mirror so as to eliminate the warm light and infrared ray out of the beam so as to warm the LCD as little as possible.

It is advantageous when the ventilator housing on the frame has at least one air discharge opening directed on the plates enclosing the liquid crystal layer in order to cool the LCD.

It is advantageous when the frame is formed as a member that can be laid on the base plate or the overhead projector housing. In this way, the frame is easily mountable and again removable, it can also at any time later be acquired as an additional part for the overhead projector, it can also be used with older apparatus.

With the arrangement of the electrodes assigned to the liquid crystals, there are considerable difficulties through the arrangment of the supply lines to the electrodes. In accordance with the invention, these difficulties are thereby reduced that the electrodes are not arranged the same over the entire surface of the writing plate but are arranged in at least two surface areas.

One surface area is advantageously provided with at least one row of alpha-numeric electrode arrangements. The other surface area on the other hand is provided with elongate curve-form electrode arrangements or elongate electrode arrangments with a plurality of branches. Through these elongate electrode arrangements, elongate pictures of curves can be produced with a reduced number of supply lines for the voltage to the electrodes. If it is desired to produce curves in diagrams of impulse sequences, for example from individual curve parts which constantly repeat, it is advantageous to provide elongate electrode arrangements with a plurality of branches. These branches then form dash-form parts of the curves while surface electrodes arranged on the opposite side determine which branches of the elongate electrodes are visible in the picture.

It is advantageous when each surface region is assigned an area on the edge of the support plate for the arrangement of supply electrodes. Complicated curves can thereby be easily produced that electrodes are arranged in at least two overlying layers insulated from one another. For the visualization of curves it is advantageous when to the surface area with elongate curve-form electrode arrangments there is assigned a control panel of the same or proportional size on which curves corresponding and proportional to the electrode arrangement are arranged and when these electrodes are assigned contactors.

Advantageously, these contactors are touch type contactors so that one needs only to touch lightly the curve of the control panel with a pencil or the finger in order to display the touched curve.

The LCD's arranged in the light beam of an overhead projector in accordance with the invention can also find use for a quite different purpose: As a rectangular paper format is usually used and the writing or drawing extends in the direction of the greater or lesser axes of the paper format, the writing plates of overhead projectors are quadratic. That has the disadvantage that either right and left or up and down according to the position of the pattern to be projected in the projected picture white stripes appear which mostly disturb the picture with their far stronger lighting. One has already sought to eliminate these disturbing white stripes through masking which has remarkably succeeded when one has enough time to prepare these masks. But in the hurry of a lecture, this does mostly not succeed. Slidable masking parts, tiltable masking parts and replaceable masking parts have been developed, but all caused the lecturer considerable difficulty by the arrangement during a lecture and lead to disconcerting the lecturer. In accordance with the invention, such masking of right and left or up and down stripes is attained through the LCD's arranged in the light beam of the overhead projector and indeed thereby that the electrodes are of a large surface and darken side portions of the writing plate.

However, another way can be selected to get the same results with the LCD's, namely, that one arranges next to the crystal in the aforementioned areas hot wires or hot electrodes which warm the liquid crystals so that these are darkened, absorb more light and thus form a mask.

If the masking of the edges by such possibilities is provided, it is advantageous when the overhead projector is equipped with an objective of variable focal length or several objectives of different focal length and/or a condenser of variable focal length or several condenser lenses of different focal length. Then on the one hand an adjustment can be made on the objective which portrays the smaller formal is stronger enlargement on the screen. Then through a condenser of variable focal length or several condenser lenses of different focal length which corresponding to the format in the light beam can be shifted better to illuminate the format to be projected so that in the projection of the smaller format, more light is conducted from the area of the small format.

The nature of the invention is more fully explained in the following with the aid of an ex-emplified embodiment illustrated schematically in the drawing.

They show.

Figure 1:
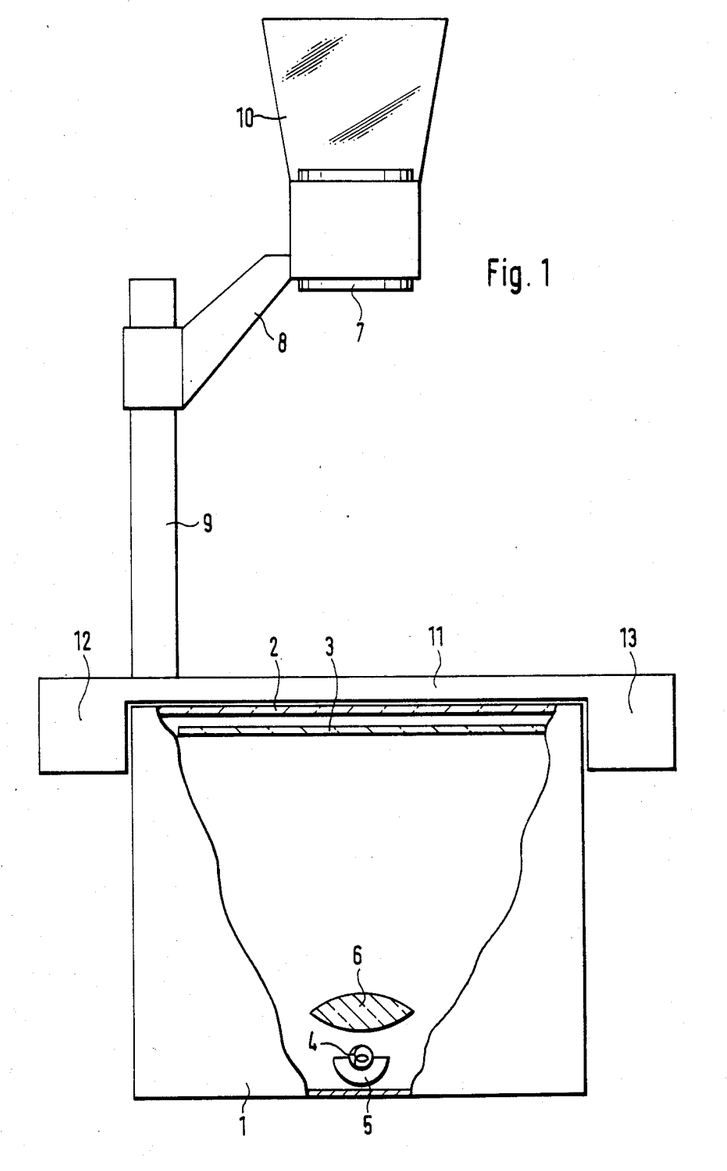
FIG. 1 A front view of an overhead projector with a light housing, partially in section and with a overlaid frame, which encloses the LCD and has at both sides housings to receive a ventilator and electronic circuit elements, FIG. 2 a front view of an overhead projector with its base plate and overlaid frame with the LCD, FIG. 3 a side view of this projector, FIG. 4 a section through a part of an LCD, FIG. 5 a section through a part of another LCD, FIG. 6 a section through a frame with an LCD and housings arranged on both sides, FIG. 7 a representation of displays with two areas, one area with alpha-numeric electrodes and another area with a curve-form electrode arrangements, FIG. 8 a display with a control panel, FIG. 9 a writing plate with large surface electrodes for masking side stripes, FIG. 10 a writing plate with heat electrodes for masking side stripes, The overhead projector of FIG. 1 comprises a housing 1, of which the upwardly directed face is closed by a transparent writing plate 2. Under the transparent writing plate 2, there is a Fresnel lens 3. At the bottom on the housing 1 there is a lamp 4 with the reflector 5 and the condenser lens 6.

The objective lens 7 of this overhead projector is carried by a carrying arm 8 which is arranged slidably and securably on a post 9 mounted at the side of the housing. Above the objective lens 7, there is a deflection mirror 10. On this overhead projector, there is laid a frame 11 which carries a housing 12,13 at each side. This frame 11 with the housings 12, 13 is shown enlarged in FIG. 6. This frame encloses an LCD. This LCD comprises an upper plate 14 which is either produced of light polarizing material or is provided with a light polarizing film. This plate 14 is made so strong that writing and drawing work can be carried out on it. Further, on the underside, there is a plate 15 which likewise is made of light polarizing material or is covered with a film of light polarizing material. This plate 15 does not need to be as strong because no writing or drawing work is carried out on it. Between the two plates, 14,15, there is a layer 16 of liquid crystals as is usually employed in an LCD. On both sides of this layer 16, there are transparent electrodes 17, preferably on the sides of the plates 14 and 15 turned towards the liquid crystals. These electrodes 17 are supplied with voltage from an electronic circuit 18 through conductors 19. This electric circuit 18 is accommodated in the housing 13 which is annexed to the frame 11. If a voltage is applied to the electrodes 17, this voltage so aligns the liquid crystals that they develop a different transparency between the electrodes 17 than in their irregular position in the case that no voltage is applied to the electrodes 17. Through this change of transparency, symbols having the form of the electrodes 17 can be made visible. The electrodes 17 can have the form of lines,, curves, surfaces or surface portions etc.

Figure 6:
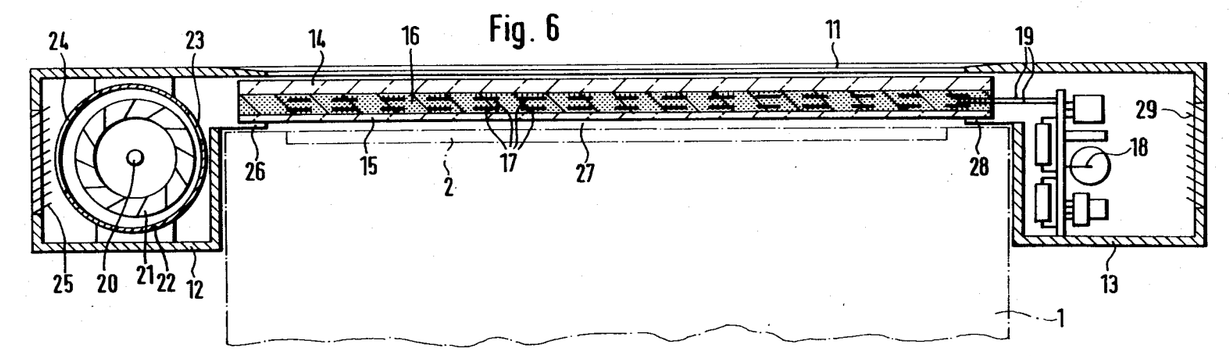

The housing 12 is arranged on the side of the frame 11 opposite to the housing 13. In this there is a ventilator 20 of which the rotor 21 runs inside a housing 22 through whose air inlet opening 23 air is drawn in and is discharged through its air outlet opening 24 and then emerges through vent slits 25 from the housing 12. The air is drawn in through a very wide and very narrow slit 26 underneath the plate 15. As the frame 11 is laid on the writing plate 2 on the upper face of the housing 1 of the overhead projector, there is formed between the writing plate 2 and the plate 15 an air slit 27 through which the air can flow along the plate 15 and into the entry slit 26.

By suitable design of the frame 11, namely by the presence of a side air seals on the sides of the frame on which no housing 12 or 13 is arranged, it is thereby attainable that cooling air can be drawn out of the housing 12 through the slit 27 and the air slit 26. The cooling air enters here through slits 29. In this manner, it is attained that the cooling air entering through the slits 29 first cools the electronic elements of the circuit 18 inside the housing 13, then flows out of the housing 13 through the air slit 28 and then flows along under the plate 15 and is drawn through the slit 26 and discharged through the exit 24 of the ventilator 20 out of the air outlet slits 25.

Figure 2:
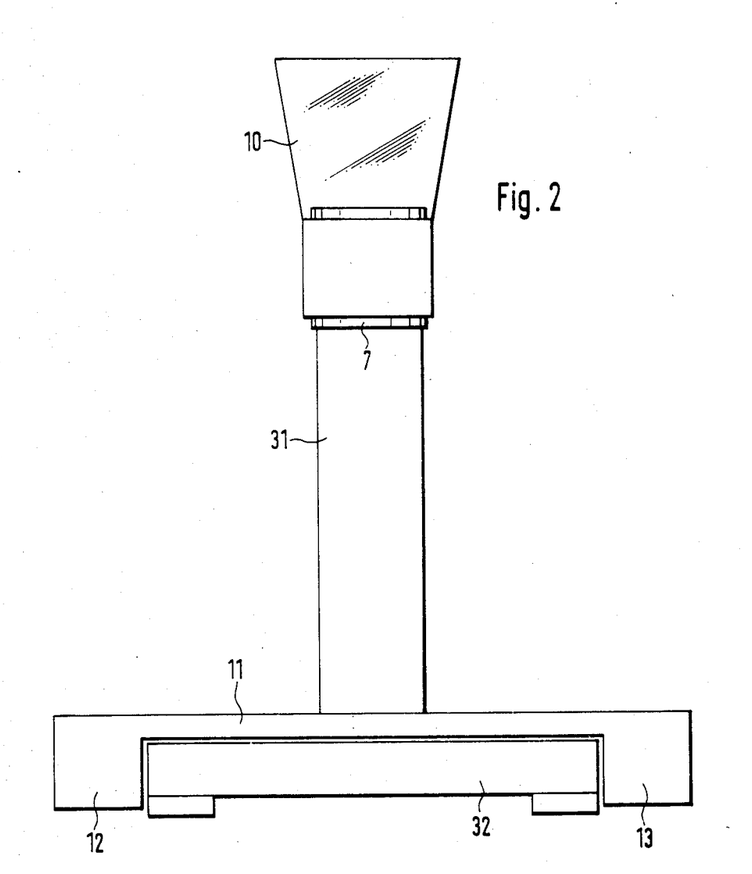
Figure 3:
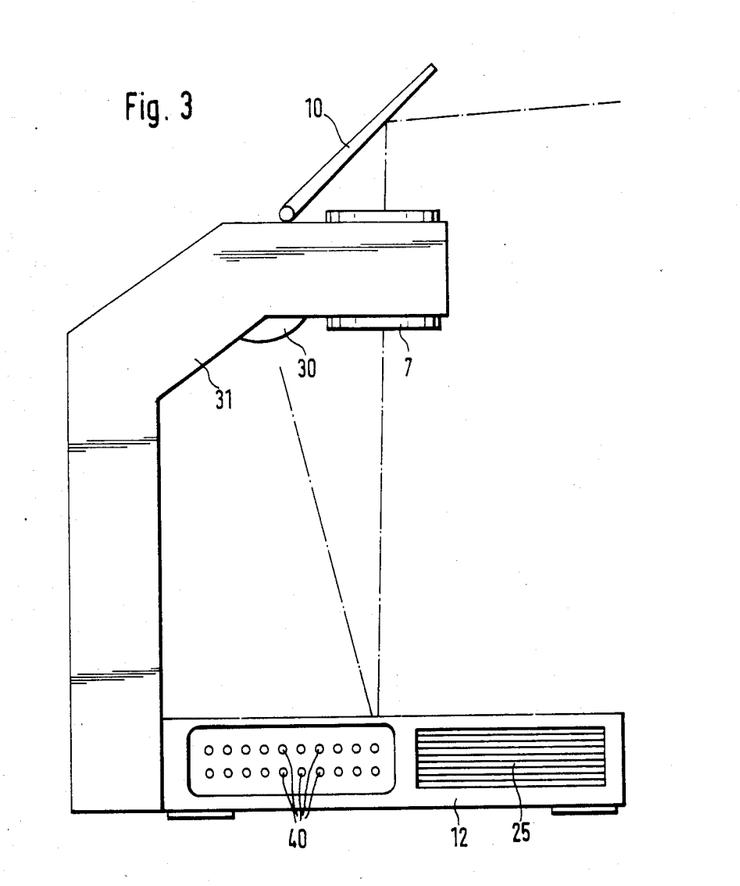

With the overhead projector according to FIG. 1 the light passes only once through the LCD formed by the plates 14,15 and the layer of liquid crystals 16. It is otherwise with an overhead projector shown in FIGS. 2 and 3 of which the light source 30 is arranged in the carrying arm 31 and which has a base plate 32 which accommodates the Fresnel lens 3 and the writing plate 2. If here, the frame 11 is laid on the base plate 32, the light passes twice through the LCD, namely the first time after leaving the light source 30 on the way to the reflector 33 underneath the Fresnel lens 3 and the second time after the reflection on the way through the Fresnel lens 30 to the objective 7. On this overhead projector, the picture formed by the aligned liquid crystals with the help of the electrodes 17 has higher contrast than with the overhead projector of FIG. 1 with which the picture is slightly sharper. With this embodiment with which the laid-on frame 11 is used, the plate 14 is used as the writing plate instead of the otherwise (without frame and without LCD) used writing plate 2. In this case, the writing plate 2 has no function in the overhead projector.

There is a plurality of types of construction, the type of construction of the frame 11 which encloses the LCD 14–17 and is provided on both sides with the housing 12 and 13 is not the only one. This type of construction is advantageous where the LCD is used as an adjunct to the overhead projector only in certain cases while otherwise the overhead projector is used without the LCD.

Figure 4:
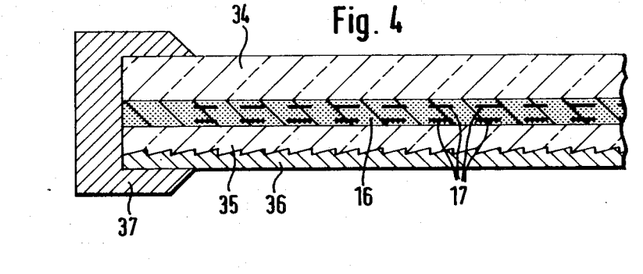

Another type of construction in which the LCD is built into the overhead projector and always remains is shown schematically in FIG. 4. Here the writing plate 34 forms one plate of the LCD, the Fresnel lens 35 with the applied reflection mirror 36 forms the other plate between which the liquid crystal layer 16 and the electrodes 17 are enclosed, whereby the plates 34, 35 either themselves are light polarizing or are provided with a light polarizing film—advantageously between the electrodes 17 and the plates 34,35. The plates 34,35 together with the reflector 36 are embraced by the frame 37. In an overhead projector of the construction of FIGS. 2 and 3, this frame 37 with the plates 34,35 is built into the base plate 32 instead of the writing plate and the reflective Fresnel lens.

Figure 5:
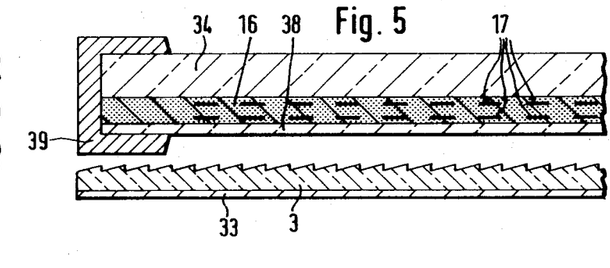

In the embodiment of FIG. 5 on the other hand, a plate 34 is provided as the writing plate and is associated with another plate 38 and held by the frame 39. Between the two plates 34,38, which either have light polarizing properties or are covered with a light polarizing film, there is a liquid crystal layer 16 together with the electrodes 17. This frame 39 together with the LCD is built into the base plate 32 of a projector instead of a writing plate. Thereby, the Fresnel lens 3 is retained with the reflector 33. This Fresnel lens with the reflector 33 lies directly under the LCD 36,16,38, serving as the writing plate.

Each frame, 11, 37, 39 is advantageously provided on one side with electrical contacts 40 for connection with the controls but also for supplying voltage.

Figure 7:
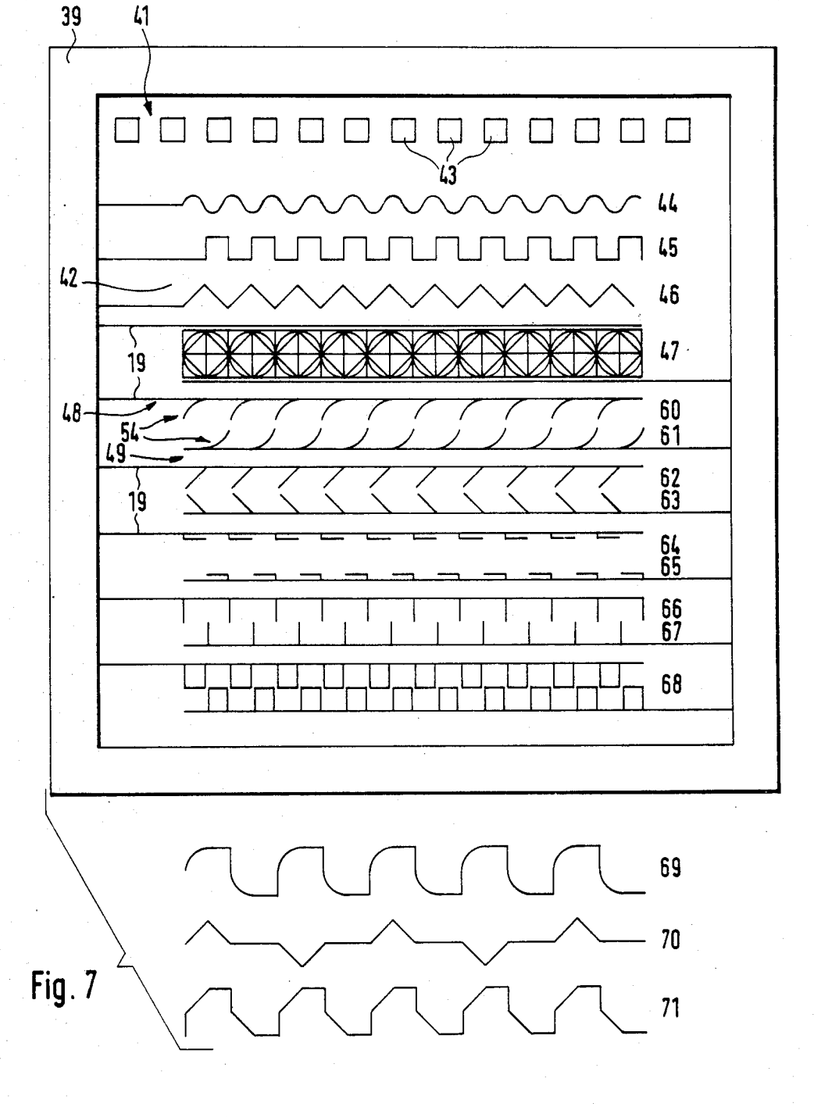

The display of FIG. 7, constructed like the previous displays and surrounded by a frame 39, has a surface area 41 with rows of alpha-numeric electrode arrangements 43. These serve to produce letter and number designs. In another surface area 42, there are provided different curve form electrode arrangements which extend from one side of the surface area to the other side. There is a sinusoidal electrode arrangement 44, a right angle electrode arrangement 45 and a saw-tooth electrode arrangement 46. Only a single conductor 19 needs to lead to each of these electrode arrangements. However, the electrode arrangements can also be produced otherwise so as to have in one and the same row images of a sine function 56, a right angle function 57 and a rectangular function 58 represented. Thereto serves an electrode arrangement 59 which is formed of a plurality of branches 54 which are assembled adjacent to the electrode arrangement 59. On one of the plates enclosing the layer 16 of liquid crystals, there are in rows 60–67, shown electrodes 60 with branches 54 of different form which are here shown singly but are assembled in a row 59. On the other opposite plate, there are arranged area electrodes 68 and indeed four to a sub-unit, whereby each electrode can be supplied with voltage individually. A plurality of sub-units are arranged in a row. There can thereby be produced curve forms which not only correspond to rows 44–46, but as formed in rows 69,70,71. This permits many other curve forms to be produced.

Figure 8:
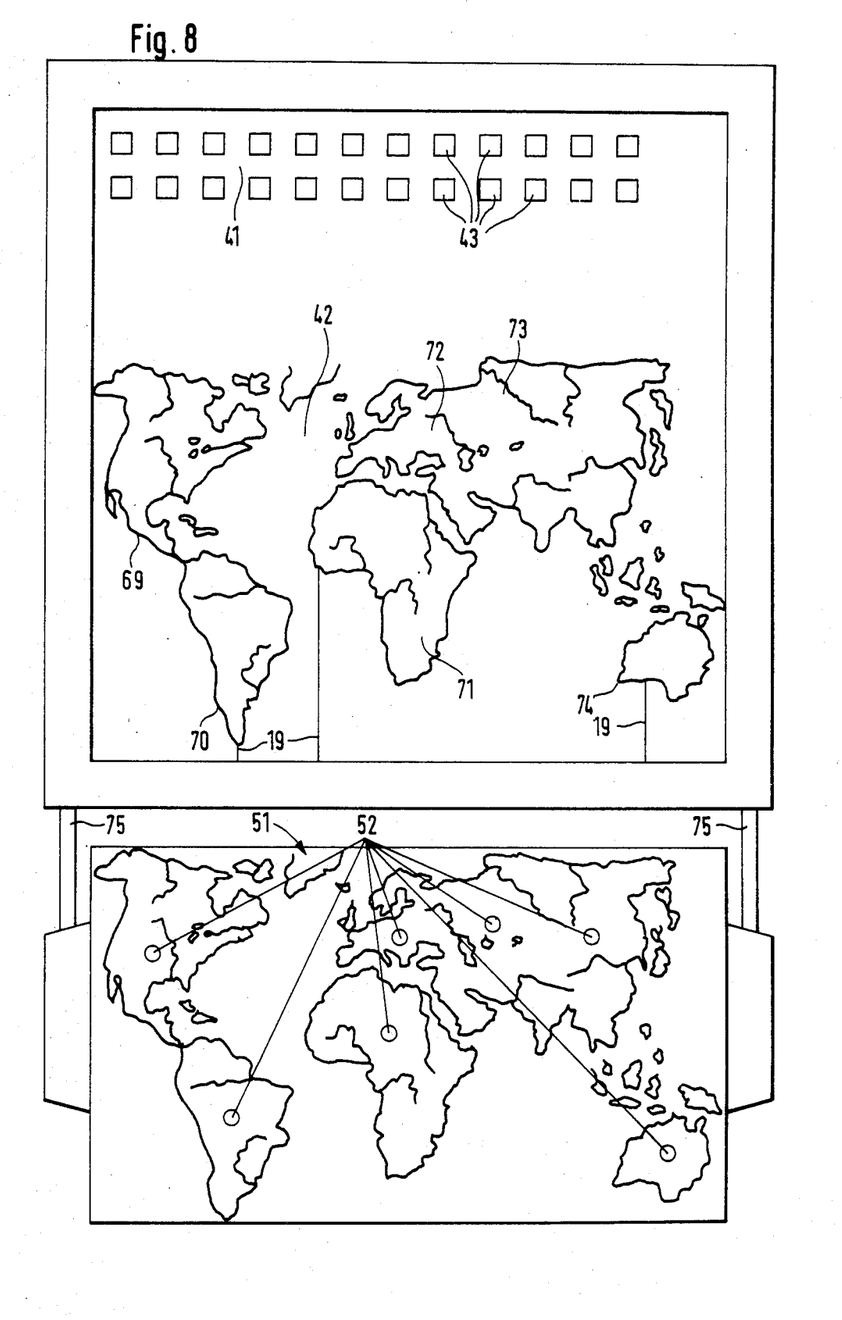
Figure 9:
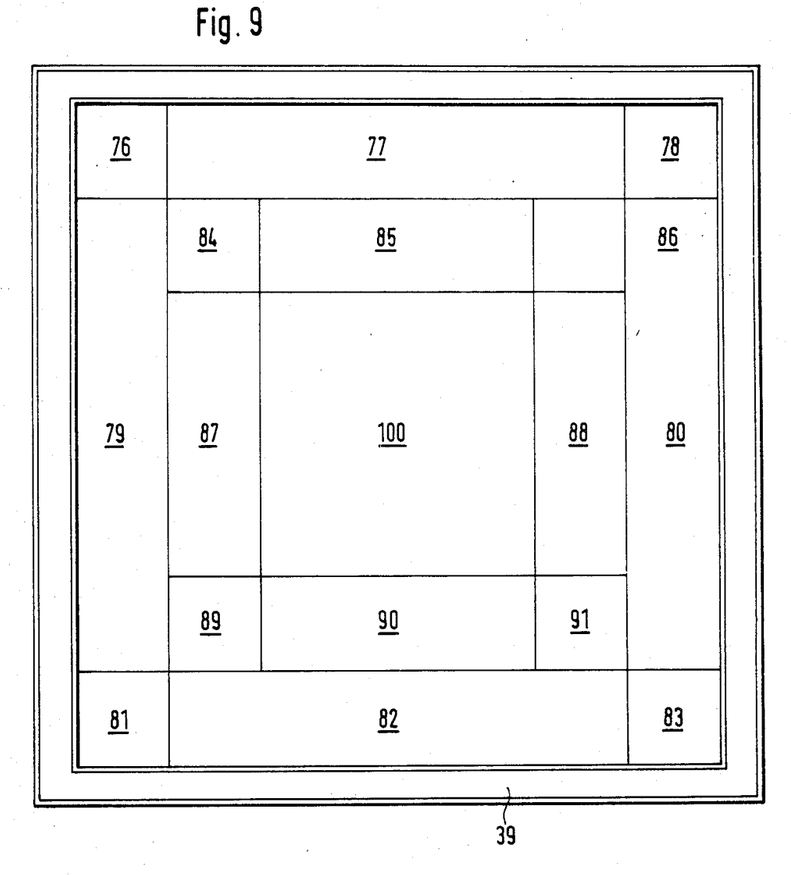

In FIG. 8, there is shown another display with two surface areas 41, 42 whereby in surface area 41 there are provided alpha-numeric electrode arrangements 43 while the surface area 42 has electrode arrangements 45 which represent a geographic picture. With this surface area 42 of the display, there is co-ordinated a switchboard 51 which carries a copy of the electrode arrangements of the surface area 42 whereby a switch 52 is assigned to each curved part 69–74. It is advantageous to form the curve parts 69–74 as contact switches. From the switchborad 51, connecting cables 75 lead to both sides of the display which are attached by means of plugs. From the plugs, conductors 19 lead to the individual curve parts 69–74. In FIG. 9 there is shown a writing plate on which large surface electrodes 76–83 are provided in order to darken side bands and also in order to be able to project a small format without disburbing white bands. For example, if it is desired to project a rectangular pattern which the surfaces 77,84,85,86,87,100,88,89,90 91,82 cover and thereby avoid white side bands, voltage is applied to the electrodes over the fields 76,79,81,78,80,83 so that here the LCD's are darkened, light absorbing and thus appear as dark bands in the projection picture. If, on the other hand, it is desired to project a square format which the surfaces 79,84,85,86,87, 100,88,80,89,90,91 cover, voltage is applied to the electrode surfaces 76,77,78,81,82,83 so that bands aligned above and below the format to be projected are darkened and appear as darker bands adjacent the projected picture. Through the surface division in FIG. 9, a pattern lying on the field 100 can be produced light while the entire surrounding border appears dark. On the other hand, a small format covered for example by the surfaces 85, 100, 90 can be projected light, while the dark border appears in that voltage is applied to and thereby darkens all electrodes surfaces which lie outside the surfaces 85,100,90.

Figure 10:
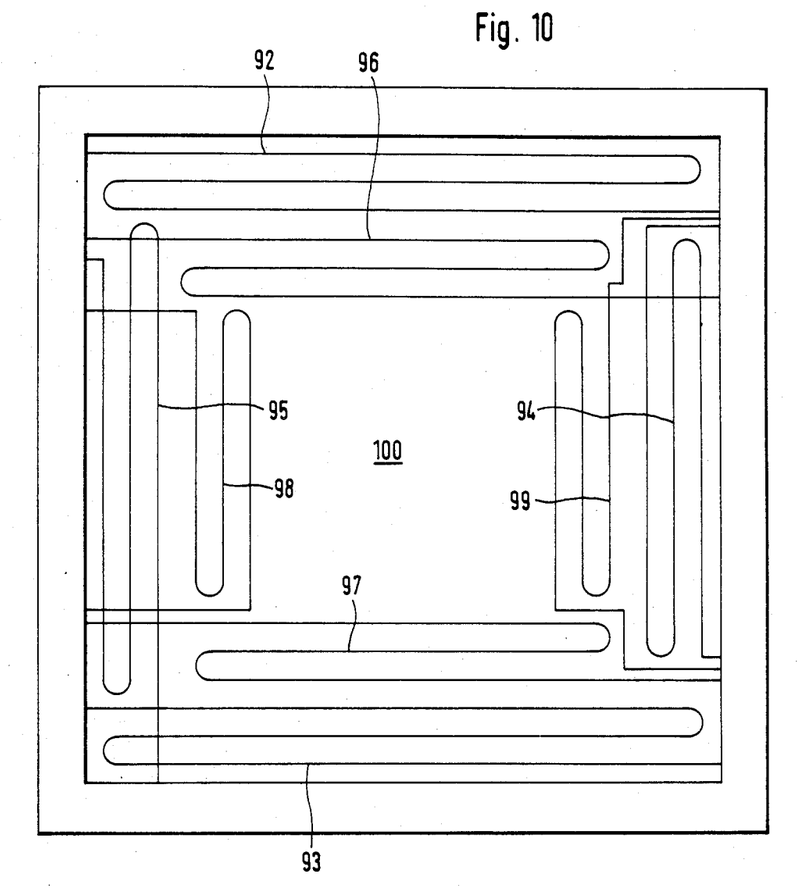

Another possibility of darkening the LCD's consist in that the LCD are warmed. This can occur through the heat electrodes 92-99 in FIG. 10 which in FIG. 10 are arranged in a similar arrangement as the fields 76–80 in FIG. 9.

I claim:

1. An overhead projector comprising a base, a transparent writing plate supported on said base, a light source, objective lens and reflector supported above said writing plate, a Fresnel lens disposed below, parallel to and spaced from said writing plate, a reflector below said Fresnel lens, a layer of light deflecting liquid crystals sandwiched between said writing plate and said Fresnel lens, transparent electrodes on opposite sides of said layer of liquid crystals, a frame holding together as a unit said writing plate, Fresnel lens and liquid crystal layer and said electrodes, and terminal contacts for said electrodes in said frame.

2. An overhead projector according to claim 1, in which said Fresnel lens has a flat surface facing said writing plate and in which said writing plate and Fresnel lens constitute supports of said liquid crystal layer and said electrodes.

3. An overhead projector according to claim 2 in which said writing plate and said Fresnel lens have light polarizing properties.

4. An overhead projector according to claim 1, in which a further transparent plate is interposed between said Fresnel lens and said liquid crystal layer, said writing plate and said further plate constituting supports of said liquid crystal layer and said electrodes.

5. An overhead projector according to claim 4, in which said writing plate and said further plate have light polarizing properties.

6. An overhead projector according to claim 1, in which said frame is hollow and contains electronic components for voltage supply to said electrodes.

7. An overhead projector according to claim 6, further comprising means for ventilating said writing plate, Fresnel lens and liquid crystal layer in said frame.

8. An overhead projector according to claim 1, in which said writing plate, Fresnel lens, liquid crystal layer and frame constitute an assembly removable as a unit from said base.

9. An overhead projector according to claim 1, in which said electrodes are arranged in at least two surface areas in a plane.

10. An overhead projector according to claim 9, in which one of said surface areas comprises at least one alpha-numeric electrode arrangement.

11. An overhead projector according to claim 9, in which one of said surface areas comprises an elongated curve form electrode arrangement.

12. An overhead projector according to claim 9, in which one of said surface areas comprises an elongate electrode arrangement with a plurality of branches.

13. An overhead projector according to claim 9, in which each of said surface areas is assigned region at the edge of said writing plate for arrangement of leads to said electrodes.

14. An overhead projector according to claim 9, further comprising a switch board comprising a plurality of contact switches arranged in a layout corresponding to the layout of said electrodes and controlling respective electrodes.

15. In an overhead projector having a base, a light source and a projecting lens, an assembly comprising a transparent writing plate, a Fresnel lens parallel to and spaced from said writing plate, a reflector below said Fresnel lens, a layer of liquid crystals sandwiched between said writing plate and said Fresnel lens, transparent electrodes on opposite sides of said layer of liquid crystals and a frame surrounding and holding together as a unit said writing plate, Fresnel lens, liquid crystal layer and electrodes, said frame being hollow and containing electronic components for actuating said electrodes, said assembly being removably received on and supported by said base.

16. An assembly according to claim 15 further comprising ventilating means housed in said frame for ventilating and thereby cooling said writing plate, Fresnel lens and liquid crystal layer.

17. An assembly according to claim 15 in which said Fresnel lens has a flat face facing said writing plate, and in which said writing plate and Fresnel lens constitute supports of said liquid crystal layer and said electrodes.

18. An assembly according to claim 17, in which said writing plate and said Fresnel lens have light polarizing properties.

* * * * *